United States Patent [19]

Müller et al.

[11] Patent Number: 4,719,244

[45] Date of Patent: Jan. 12, 1988

[54] POLYISOCYANATE PREPARATIONS AND THEIR USE FOR THE PRODUCTION OF POLYURETHANE PLASTICS

[75] Inventors: Hanns P. Müller, Odenthal-Blecher; Bernhard Jansen, Cologne; Rudolf Hombach, Leverkusen, all of Fed. Rep. of Germany

[73] Assignee: Bayer Aktiengesellschaft, Leverkusen, Fed. Rep. of Germany

[21] Appl. No.: 25,902

[22] Filed: Mar. 13, 1987

[30] Foreign Application Priority Data

Mar. 26, 1986 [DE] Fed. Rep. of Germany ....... 3610198

[51] Int. Cl.$^4$ .......................................... C08G 18/14
[52] U.S. Cl. .................................. 521/115; 252/182; 502/167; 528/53
[58] Field of Search .......................... 521/115; 528/53; 252/182; 502/167

[56] References Cited

U.S. PATENT DOCUMENTS 4,186,254  1/1980  Cuscurida et al. .................... 528/53

OTHER PUBLICATIONS

Becker/Braun "Kunststoffe-Handbuch", vol. 7, Carl Hanser Verlag, Munich, Vienna, 1983, pp. 404–405 (English version).
M. Dollhausen, W. Warrach, "Polyurethane Adhesives Technology", 1982.
R. Jordon, "Polyurethane als Klebstoffe", Seifen–Ole–Fette–Wachse, 109, 1983, No. 11/12, pp. 333 et seq.
B. Kiyawa-Renczek, P. Penczek, "Polyurethan-Klebstoffe: Fortschitte in den 80er Jahren, 1984.
A. Farkas and G. A. Mills, "Advanced Catalysis", pp. 393 et seq., 1962.
J. Saunders and K. C. Frisch, "Polyurethanes" Part I., Wiley Interscience Publishers, N.Y., 1962, Chapter IV et seq.
K. C. Frisch and L. P. Rumao, J. Macromol. Science–Revs. Macromol. Chem., (CS1), pp. 103–et seq., 1970.

*Primary Examiner*—Maurice J. Welsh
*Attorney, Agent, or Firm*—Gene Harsh; Joseph C. Gil; Thomas W. Roy

[57] ABSTRACT

The present invention is directed to polyisocyanate compositions containing
(a) at least one organic polyisocyanate and
(b) at least one dissolved catalyst corresponding to the general formula

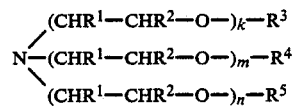

wherein
$R^1$ and $R^2$ may be identical or different and denote hydrogen or a methyl group, provided that $R^1$ and $R^2$ do not both stand for a methyl group,
$R^3$, $R^4$ and $R^5$ denote identical or different organic groups which are inert in isocyanate addition reactions and
k, m and n represent identical or different integers with values from 1 to 5.

The present invention also relates to the use of the polyisocyanate compositions as the polyisocyanate component for the production of polyisocyanate polyaddition products, especially moisture cure coating compositions or adhesives.

14 Claims, No Drawings

POLYISOCYANATE PREPARATIONS AND THEIR USE FOR THE PRODUCTION OF POLYURETHANE PLASTICS

BACKGROUND OF THE INVENTION

1. Field of the Invention

This invention relates to new polyisocyanate compositions which contain particular tertiary amines in addition to a polyisocyanate component and to their use as starting materials for the production of polyisocyanate polyaddition products, preferably polyurethane plastics.

2. Description of the Prior Art

Catalysis of the isocyanate addition reaction is of great importance in industrial polyurethane chemistry. The following is a survey of the literature relating to the catalysts conventionally used and their mode of action: A. Farkas and G. A. Mills, Advanced Catalysis, 13.393 (1962); J. H. Saunders and K. C. Frisch, Polyurethanes, Part I, Wiley Interscience, New York, 1962, Chapter VI and K. C. Frisch and L. P. Rumao, J. Macromol, Sci. Revs. Macromol. Chem. (5/1), 103–150 (1970).

The use of polyisocyanates and polyisocyanate compositions, in particular polyurethane prepolymers containing free isocyanate groups, as adhesives has also been known for a long time and is also recorded in the literature: M. Dollhausen, W. Warrach, Polyurethane Adhesives Technology, Adhesives Age, June 1982, page 28; R. Jordan, Polyurethane als Klebstoffe, Seifen Öle, Fette, Wachse, 109 (1983), No. 11/12, pages 333–336; B. Kujawa-Penczek, P. Penczek, Polyurethan-Klebstoffe, Fortschritte in den 80er Jahren, Adhäsion 28 (1984) No. 3, pages 7–12. In addition, prepolymers containing free isocyanate groups may be used as binders for air drying coating compositions, i.e. coating compositions which can be hardened by atmospheric moisture (see, for example, Becker/Braun "Kunststoff-Handbuch", Volume 7, Carl Hanser Verlag Munich/Vienna (1983), pages 545 et seq).

The open time of adhesives based on such isocyanate prepolymers and the pot life and drying speed of the corresponding coating compositions depend primarily on the isocyanate group content of the prepolymers and the reactivity of the isocyanate groups. It has frequently been attempted to adjust these properties by the addition of a catalyst but this may cause problems in storage stability.

When polyurethane prepolymers containing free isocyanate groups are kept in storage, they can undergo discoloration, uncontrolled changes in viscosity and the formation of solid particles, especially when light, atmospheric oxygen and moisture are not completely excluded. These undesirable side reactions, which frequently render the products unusable after a certain time in storage, may be accelerated or in many cases caused by the catalysts conventionally used.

It is therefore an object of the present invention to provide new polyisocyanate compositions containing a catalyst which while capable of adjusting the reactivity of the preparations as desired, has a less deleterious effect on the storage stability of the compositions than the catalysts hitherto used.

This problem may be solved by providing the compositions according to the invention described below. The compositions according to the invention are characterized by the presence of certain aminic catalysts of a type defined in more detail below. It was surprising to find that these special amines were particularly suitable for solving the given problem since one would have expected the catalysts according to the invention to behave like amine-initiated polyether polyols, i.e. polyether polyols containing tertiary amino groups. In this case the stability in storage of compositions containing the catalysts according to the invention would be expected to be similar to that of isocyanate prepolymers based on polyether polyols containing tertiary nitrogen atoms. This is surprisingly found not to be the case and the compositions according to the invention have a much greater stability in storage than corresponding compositions based on the aforesaid polyether polyols containing tertiary nitrogen.

SUMMARY OF THE INVENTION

The present invention is directed to polyisocyanate compositions containing
(a) at least one organic polyisocyanate and
(b) at least one dissolved catalyst corresponding to the general formula

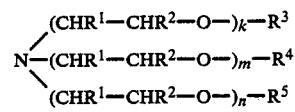

wherein
$R^1$ and $R^2$ may be identical or different and denote hydrogen or a methyl group, provided that $R^1$ and $R^2$ do not both stand for a methyl group,
$R^3$, $R^4$ and $R^5$ denote identical or different organic groups which are inert in isocyanate addition reactions and
k, m and n represent identical or different integers with values from 1 to 5.

The invention also relates to the use of the polyisocyanate compositions according to the invention as the polyisocyanate component for the production of polyisocyanate polyaddition products, preferably polyurethane plastics, by the isocyanate polyaddition process.

Lastly, the invention relates to the use of the polyisocyanate compositions according to the invention as coating compounds or adhesives capable of being hardened by the action of moisture or as binders for the production of such coating compositions or adhesives.

DETAILED DESCRIPTION OF THE INVENTION

Component (a) of the polyisocyanate compositions according to the invention is based on at least one organic polyisocyanate, i.e. any compound or mixture having at least 2 organically bound isocyanate groups per molecule.

These include both low molecular weight polyisocyanate having a molecular weight below 400 and modification products of such low molecular weight polyisocyanates having a molecular weight, calculated from the functionality and functional group content, of 400 to about 10,000, preferably about 600 to 8,000, and most preferably about 800 to 5,000. The low molecular weight polyisocyanates may include compounds corresponding to the formula $$Q(NCO)_n$$

wherein n=2 to 4, preferably 2, and

Q denotes an aliphatic hydrocarbon group having 2 to 18, preferably 6 to 10 carbon atoms; a cycloaliphatic hydrocarbon group having 4 to 15, preferably 5 to 10 carbon atoms, an aromatic hydrocarbon group having 6 to 15, preferably 6 to 13 carbon atoms; or an araliphatic hydrocarbon group having 8 to 15, preferably 8 to 13 carbon atoms.

The following are examples of such low molecular weight polyisocyanates: hexamethylene diisocyanate, 1,12-dodecane diisocyanate, cyclobutane-1,3-diisocyanate, cyclohexane-1,3- and -1,4-diisocyanate and any mixtures of these isomers, 1-isocyanato-3,3,5-trimethyl-5-isocyanatomethyl cyclohexane, hexahydro-1,3- and-/or -1,4-phenylene diisocyanate, perhydro-2,4'- and/or -,4,4'-diphenylmethane diisocyanate, 1,3- and 1,4-phenylene diisocyanate, 2,4- and 2,6-tolylene diisocyanate and any mixtures of these isomers, diphenylmethane -2,4'- and/or -4,4'-diisocyanate, naphthylene-1,5-diisocyanate, triphenylmethane-4,4',4"-triisocyanate and polyphenyl-polymethylene polyisocyanates of the kind obtained by aniline/formaldehyde condensation followed by phosgenation.

The relatively high molecular weight polyisocyanates may be modification products of such simple polyisocyanates, i.e. polyisocyanates containing structural units such as isocyanurate, carbodiimide, allophanate, biuret or uretdione groups. These may be obtained by known processes from the simple polyisocyanates mentioned above. Among the relatively high molecular weight, modified polyisocyanates, the prepolymers known from polyurethane chemistry containing isocyanate end groups and having molecular weights in the range of 400 to about 10,000, preferably about 600 to 8,000 and most preferably about 800 to 5,000 are of particular interest. These compounds are prepared in known manner by the reaction of excess quantities of simple polyisocyanates of the type exemplified above with organic compounds containing at least 2 isocyanate-reactive groups, in particular organic polyhydroxyl compounds. Suitable polyhydroxyl compounds of this type include both simple polyhydric alcohols in the molecular weight range of 62 to 599, preferably 62 to about 200, e.g. ethylene glycol, trimethylolpropane, propane-1,2-diol and butane-1,2-diol and, more particularly, relatively high molecular weight polyether polyols and/or polyester polyols known from polyurethane chemistry which have molecular weights in the range of 600 to about 8,000, preferably about 800 to 4,000 and contain at least 2, preferably 2 to 8 and most preferably 2 to 4 primary and/or secondary hydroxyl groups. Isocyanate prepolymers obtained, for example, from low molecular weight polyisocyanates of the type exemplified above and less preferred compounds containing isocyanate-reactive groups, e.g. polythioether polyols, hydroxyl-containing polyacetals, polyhydroxy polycarbonates, hydroxyl-containing polyester amides or hydroxyl-containing copolymers of olefinically unsaturated compounds may, of course, also be used. Compounds containing isocyanate-reactive groups, in particular hydroxyl groups, suitable for the preparation of isocyanate prepolymers are disclosed, for example, in U.S. Pat. No. 4,218,543, herein incorporated by reference in its entirety, at col. 7, line 29 to col. 9, line 25. For preparing the isocyanate prepolymers, these compounds containing isocyanate-reactive groups are reacted with simple polyisocyanates of the type exemplified above in proportions corresponding to an NCO-/OH equivalent ratio in the range of about 1.5:1 to 20:1, preferably about 5:1 to 15:1. The isocyanate prepolymers generally have an isocyanate content of about 2.5 to 25% by weight, preferably about 6 to 20% by weight. This indicates that in the context of the present invention, the terms "isocyanate prepolymers" and "prepolymers containing isocyanate end groups" include both the reaction products as such and mixtures thereof with excess quantities of unreacted starting polyisocyanates. The latter are frequently also referred to as "semiprepolymers."

Polyisocyanate components (a) which are particularly preferred for the process according to the invention are the commercial polyisocyanates, i.e. hexamethylene diisocyanate, 1-isocyanato-3,3,5-trimethyl-5-isocyanatomethyl cyclohexane (isophorone diisocyanate, or IPDI), 4,4'-diisocyanatodicyclohexylmethane, 2,4-diisocyanatotoluene and mixtures thereof with 2,6-diisocyanatotoluene, 4,4'-diisocyanatodiphenylmethane and mixtures thereof with the corresponding 2,4'- and 2,2'-isomers, polyisocyanate mixtures of the diphenylmethane series obtained by phosgenating aniline/formaldehyde condensates, modification products of these commercial polyisocyanates containing biuret or isocyanurate groups and, in particular, isocyanate prepolymers of the above-mentioned type based on these commercial polyisocyanates or any mixtures of such polyisocyanates and the simple polyols and/or polyether polyols and/or polyester polyols exemplified above.

Catalyst component (b) according to the invention is based on tertiary amines corresponding to the general formula mentioned above. Preferred tertiary amines are those corresponding to the aforesaid formula wherein $R^1$ and $R^2$ are both hydrogen, $R^3$, $R^4$ and $R^5$ are identical alkyl groups having 1 to 4 carbon atoms and k, m and n represent identical or different integers having a value from 1 to 3.

It is particularly preferred to use the compound corresponding to the formula

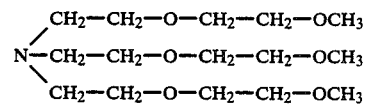

as component (b) according to the invention.

The catalysts according to the invention may be prepared either by the alkoxylation of ammonia using ethylene oxide and/or propylene oxide, preferably ethylene oxide, and etherification of the resulting trifunctional amino alcohols in known manner, for example by reaction with alkyl halides such as methyl iodide, or they may be prepared by similar alkoxylation of a monohydric alcohol $R^3$—OH or of a mixture of different alcohols $R^3$—OH, $R^4$—OH and $R^5$—OH (in accordance with the definition of $R^3$, $R^4$ and $R^5$ given above, all or two of these alcohols may be identical), followed by reaction of the resulting monohydric ether alcohols with ammonia, for example in the presence of Raney Nickel as catalyst, as described by Gerard Soula in J. Org. Chem. (1985), 50, 3717–3721.

The monohydric alcohols used as starters for the alkoxylation reaction in the last mentioned method of preparation of the catalysts according to the invention may be any organic compounds containing an alcoholic hydroxyl group but containing no Zerewitinoff active hydrogen atoms apart from this hydroxyl group and being free from any groups which are catalytically active in isocyanate addition reactions, such as tertiary amine nitrogen atoms, carboxylate groups or metal atoms. The term "inert in isocyanate addition reactions" used in the context of the present invention therefore denotes the absence of Zerewitinoff active hydrogen atoms and the absence of any centers accelerating or retarding the reactivity of isocyanate groups. Examples of suitable starter compounds include simple alcohols such as methanol, ethanol, n-propanol, n-butanol, isopropanol and isobutanol, 2-hydroxy ethylacetate, ethylene glycol monomethyl ether, diethylene glycol monomethyl ether, and the like. It would in principle also be possible to use phenols as starters for the preparation of the catalysts according to the invention, e.g. phenol itself, cresols or naphthols although the use of these compounds as starters is less preferred. The starter molecules generally have a molecular weight in the range of 32 to about 200. The above-mentioned simple alcohols are particularly preferred, especially methanol.

In the polyisocyanate compositions according to the invention, the catalysts (b) are present in quantities of about 0.01 to 10% by weight, preferably about 0.5 to 8% by weight, based on the weight of polyisocyanate component (a).

The polyisocyanate compositions according to the invention may also contain the known auxiliary agents and additives (c) used in polyurethane chemistry.

Examples of these components (c) include the solvents used in the technology of adhesives and lacquers, such as toluene, xylene, ethyl acetate, butyl acetate, methylethyl ketone, methyl isobutyl ketone, ethylene glycol, monoethyl ether acetate and any mixtures of such solvents as well as pigments, fillers and levelling agents.

For producing the polyisocyanate compositions according to the invention, components (a), (b) and optionally (c) are mixed together either all at once or in any desired sequence.

The resulting polyisocyanate compositions according to the invention are suitable for use as the polyisocyanate component in the preparation of polyisocyanate polyaddition products, preferably polyurethane resins, by reaction with compounds containing isocyanate-reactive hydrogens in accordance with the isocyanate polyaddition process. The polyisocyanate compositions may be used for the production of polyurethane foams or polyurethane elastomers, but it is particularly preferred to use the polyisocyanate compositions according to the invention as one-component adhesives or coating compounds which harden under the influence of moisture or as binders for such adhesives or coating compounds. These one-component systems are highly stable in storage and their open time (adhesives) or pot life and drying speed (coating compounds) can easily be adjusted to individual requirements by varying the concentration of the catalysts b) according to the invention.

The invention is further illustrated, but is not intended to be limited by the following examples in which all parts and percentages are by weight unless otherwise specified.

EXAMPLES

EXAMPLE 1a (comparison)

100 parts of a commercial polyphenyl-polymethylene polyisocyanate obtained by the phosgenation of an aniline/formaldehyde condensate (viscosity at 25° C.=20,000 mPas; NCO content=31%) (crude MDI) were reacted with 32.2 parts of propoxylated triethanolamine (OH number=150 mg KOH/g) to produce a prepolymer having an isocyanate content of 20.2% and a viscosity at 25° C. of 20,000 mPas. The tertiary amine nitrogen content of the isocyanate prepolymer was 0.3%.

EXAMPLE 1b (according to the invention)

100 parts of the polyisocyanate from Example 1a were reacted with 32.2 parts of propoxylated trimethylolpropane (OH number 150 mg KOH/g) to form an isocyanate prepolymer having an isocyanate content of 20% and a viscosity at 25° C. of 13,640 mPas. 10 parts of a catalyst corresponding to the formula

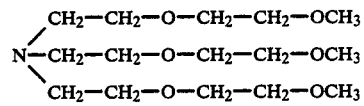

were added to the prepolymer. The resulting polyisocyanate composition had a tertiary amine nitrogen content of 0.3%.

EXAMPLE 2

(comparison of storage stabilities of the polyisocyanate compositions from Examples 1a and 1b)

To determine the storage stabilities, the substances to be investigated were introduced into small flasks and kept at 80° C. until the substance was no longer fluid.

The values obtained were as follows: Polyisocyanate composition Example 1a=255 h Polyisocyanate composition Example 1b=300 h.

EXAMPLE 3

(preparation of an isocyanate prepolymer)

500 parts of the polyisocyanate from Example 1a were introduced into a reaction vessel and heated to 60° C. 500 g of a polypropylene glycol having a molecular weight of 2,000 were then added at such a rate that the temperature does not rise above 65° C. When all the polypropylene glycol has been added, the reaction mixture was stirred at 60° C. until the isocyanate content was 13.2%. The resulting isocyanate prepolymer had a viscosity at 25° C. of 8,000 mPas.

EXAMPLE 4

(adhesive mixtures of the prepolymer from Example 3)

Adhesive mixtures were prepared in 5 parallel experiments (a) to (e), using the isocyanate prepolymer described in Example 3 and differing quantities of the catalyst according to the invention from Example 1b.

The curing time of each mixture was determined by spreading a small quantity of substance on a glass plate to form a film 0.2 mm in thickness. Curing took place in an air conditioned chamber at 23° C. and 50% relative humidity.

The following table shows the results obtained:

| Serial no. | % catalyst | Time taken for substance to become tack-free |
|---|---|---|
| a | 0.01 | after days |
| b | 1 | 70 mins. |
| c | 2 | 38 mins. |
| d | 3 | 30 mins. |
| e | 4 | 20 mins. |

EXAMPLE 5

648.8 parts of 4,4'-diisocyanatodiphenylmethane which had been liquified by carbodiimidization of a portion of the isocyanate groups and had an isocyanate content of 28% were reacted with 192.4 parts of polypropylene glycol having an OH number of 112 and 128.2 parts of a polyether polyol with OH number 250 prepared by the propoxylation of glycerol to form an isocyanate prepolymer. 45.28 parts of the catalyst according to the invention from Example 1b and 0.49 parts of benzoyl chloride were then added to the isocyanate prepolymer obtained.

The polyisocyanate composition obtained had an isocyanate content of 13.5%, a viscosity at 25° C. of 35,137 mPas and a tertiary amine nitrogen content of 0.19%.

The polyisocyanate composition was suitable for use as an adhesive which hardens under the influence of atmospheric moisture.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate composition comprising
   (a) at least one organic polyisocyanate and
   (b) at least one catalyst present in solution and corresponding to the formula

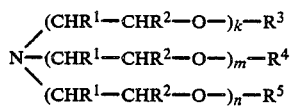

wherein
$R^1$ and $R^2$ are identical or different and denote hydrogen or a methyl group, provided that $R^1$ and $R^2$ do not both stand for a methyl group,
$R^3$, $R^4$ and $R^5$ denote identical or different organic groups which are inert in isocyanate addition reactions, and
k, m and n are identical or different integers having values from 1 to 5.

2. The polyisocyanate composition of claim 1 wherein component (b) is present in an amount of about 0.01 to 10% by weight, based on component (a).

3. The polyisocyanate composition of claim 1 wherein said organic polyisocyanate (a) is a prepolymer having an average molecular weight of 400 to about 10,000, containing isocyanate end groups and having an isocyanate group content of about 2.5 to 25% by weight.

4. The polyisocyanate composition of claim 2 wherein said organic polyisocyanate (a) is a prepolymer having an average molecular weight of 400 to about 10,000, containing isocyanate end groups and having an isocyanate group content of about 2.5 to 25% by weight.

5. The polyisocyanate composition of claim 1 wherein
$R^1$ and $R^2$ are hydrogen,
$R^3$, $R^4$ and $R^5$ denote identical or different alkyl groups having 1 to 4 carbon atoms and
k, m and n denote identical or different integers having values from 1 to 3.

6. The polyisocyanate composition of claim 2 wherein
$R^1$ and $R^2$ are hydrogen,
$R^3$, $R^4$ and $R^5$ denote identical or different alkyl groups having 1 to 4 carbon atoms and
k, m and n denote identical or different integers having values from 1 to 3.

7. The polyisocyanate composition of claim 3 wherein
$R^1$ and $R^2$ are hydrogen,
$R^3$, $R^4$ and $R^5$ denote identical or different alkyl groups having 1 to 4 carbon atoms and
k, m and n denote identical or different integers having values from 1 to 3.

8. The polyisocyanate composition of claim 4 wherein
$R^1$ and $R^2$ are hydrogen,
$R^3$, $R^4$ and $R^5$ denote identical or different alkyl groups having 1 to 4 carbon atoms and
k, m and n denote identical or different integers having values from 1 to 3.

9. The polyisocyanate composition of claim 1 wherein component (b) is a tertiary amine corresponding to the formula

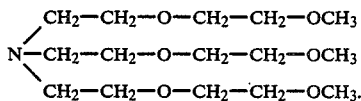

10. The polyisocyanate composition of claim 2 wherein component (A) is a tertiary amine corresponding to the formula

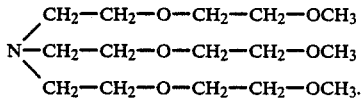

11. The polyisocyanate composition of claim 3 wherein component (b) is a tertiary amine corresponding to the formula

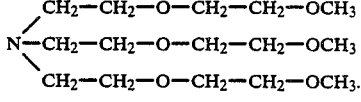

12. The polyisocyanate composition of claim 4 wherein component (b) is a tertiary amine corresponding to the formula

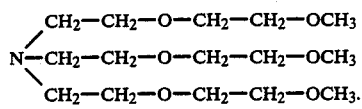

13. A process for the preparation of a polyisocyanate polyaddition product which comprises reacting the polyisocyanate composition of claim 1 with a compound containing isocyanate-reactive hydrogens.

14. The process of claim 13 wherein said polyisocyanate polyaddition product is a moisture cure coating or adhesive and said compound containing isocyanate-reactive hydrogens comprises water.

* * * * *